United States Patent [19]
Assouad et al.

[11] Patent Number: 5,995,308
[45] Date of Patent: Nov. 30, 1999

[54] DISK RESIDENT DEFECTIVE DATA SECTOR INFORMATION MANAGEMENT SYSTEM ON A HEADERLESS MAGNETIC DISK DEVICE

[75] Inventors: Nicolas C. Assouad, Niwot; Thomas G. Adams, Longmont; Aaron Wade Wilson, Berthoud, all of Colo.

[73] Assignee: STMicroelectronics N.V., The Netherlands

[21] Appl. No.: 08/829,218

[22] Filed: Mar. 31, 1997

[51] Int. Cl.⁶ .................................................... G11B 5/09
[52] U.S. Cl. ................................................ 360/53; 360/48
[58] Field of Search .................................. 360/48, 77.08, 360/53; 395/500, 853, 888; 711/154, 202–205; 382/103; 714/54, 765–766, 714, 733

[56] References Cited

U.S. PATENT DOCUMENTS

| | | | |
|---|---|---|---|
| 5,018,218 | 5/1991 | Peregrim et al. | 382/103 |
| 5,036,408 | 7/1991 | Leis et al. | 360/48 |
| 5,247,638 | 9/1993 | O'Brien et al. | 710/68 |
| 5,509,018 | 4/1996 | Niijima et al. | 365/185.09 |
| 5,715,106 | 2/1998 | Kool et al. | 360/48 |
| 5,784,216 | 7/1998 | Zaharris | 360/48 |
| 5,802,584 | 9/1998 | Kool et al. | 360/77.08 X |

*Primary Examiner*—W. Chris Kim
*Assistant Examiner*—Dan I. Davidson
*Attorney, Agent, or Firm*—Theodore E. Galanthay; Lisa K. Jorgenson; William J. Kubida

[57] ABSTRACT

A disk resident system for managing defective data sector information in a defective data sector map in a headerless format magnetic disk device. The defective data sector map is stored in gaps between fields in the headerless disk format itself or in existing disk administration fields. The defective data sector map includes a plurality of binary digits that individually correspond to a defective or non-defective status of an individual data sector on at least one section of at least one track proximate to the defective data sector map. The defective data sector map can be minimized by compressing repetitive 0's or 1's in the map. ECC coding and/or other redundancy checks can be included to ensure validity of the defective data sector map.

26 Claims, 5 Drawing Sheets

DISK RESIDENT DEFECTIVE DATA SECTOR INFORMATION MANAGEMENT SYSTEM ON A HEADERLESS MAGNETIC DISK DEVICE

FIELD OF THE INVENTION

This invention relates to the field of magnetic disk device formats, and in particular to a disk resident system for managing defective data sector information in a defective data sector map on headerless format magnetic disk device.

PROBLEM

A specific point on the concentric tracks of a magnetic disk is identified by a unique address that typically includes a cylinder number, a head number, and data sector number. To help position a read/write head over a specific point on the magnetic disk, special markers called servo bursts are located at regularly spaced intervals throughout the recording surface of the magnetic disk. The servo bursts each contain a cylinder, head, and servo burst number that are used to orient the read/write heads so that a target address on the magnetic disk can be located. The cylinder and head portion of a target address identify a specific track on the magnetic disk and the data sector portion of a target address identifies a specific data sector on the track. Because there are a fixed number of bytes in a data sector and there are a fixed number of bytes between servo bursts on a given track, the exact location of a target data sector can be calculated once the track is located.

One problem with calculating the exact location of a target data sector is that some data sectors on a given track must be skipped because they are defective and can not be reliably used for data storage. In historic magnetic disk devices that included headers for each data sector on the disk, defective data sector information was stored in each sector's header where the information was readily available during read/write operations. Today, in existing magnetic disk devices that have eliminated data sector headers from the disk format, defective data sector information is stored in Random Access Memory (RAM) tables that are managed by the disk control components. However, the defective data sector information in the RAM tables is often subject to problems that include, but are not limited to, corruption of data in the tables, performance overhead and additional electronics requirements to ensure data integrity, and inefficient table searching schemes to retrieve information from the tables. Thus, data access times can be adversely affected, for example, if an extra revolution of the disk results due to the inability to retrieve the defective data sector information from the RAM tables quickly enough.

For these reasons there is a need for reliable and more accessible defective data sector information that is resident on the disk itself in a headerless disk format magnetic disk device. A solution to this problem as disclosed and claimed herein has heretofore not been known prior to the present invention.

SOLUTION

The above identified problems are solved and an advancement achieved in the field due to the disk resident defective data sector information management system in a headerless format magnetic disk device. The defective data sector information management system includes a defective data sector map containing a plurality of binary digits. Each binary digit individually represents the defective or non-defective status of a data sector in a section of at least one track on the magnetic disk. The plurality of binary digits in successive defective data sector maps provides a look-ahead capability so that defective data sectors that exist among a plurality of consecutive data sectors can be identified and avoided. The defective data sector information is collected and stored on the magnetic disk at disk manufacturing time.

In one embodiment the individual defective data sector maps are stored in gaps that exist throughout the headerless format of a magnetic disk. One example of a gap in the headerless format of a magnetic disk is the area immediately preceding and/or immediately following a servo burst. In another embodiment individual defective data sector maps are stored in disk administration fields throughout the headerless format of a magnetic disk. One example of a disk administration field is a servo burst. Although any gap or disk administration field can be used to store the defective data sector maps, the area within or immediately adjacent to a servo burst is the preferred location so that the defective data sector information can be read at substantially the same time as a servo burst orientation marker is encountered.

Correlating redundant bits of a successive plurality of consecutive defective data sector maps that correspond to a common region of the magnetic disk device facilitates the ability for the system to identify inconsistencies in any one of the successive plurality of consecutive defective data sector maps. In addition, individual defective data sector maps can be checked for errors by including an Error Correcting Code (ECC) with each defective data sector map. The ECC code can also facilitate the correction of certain errors detected in the defective data sector map. One of many examples of an ECC is a Hamming code.

The number of defective data sector maps on a disk and the size of each defective data sector map can vary according to the look-ahead requirements of individual magnetic disk device implementations. In particular, the size of a defective data sector map can be minimized by redundancy compressing multiple like-type bits within the map. For example, because a majority of data sectors on a disk are non-defective, defective data sector maps that contain all or a majority of "0" bits can be compressed to indicate N successive 0 bits without all N bits being present.

DETAILED DESCRIPTION

Figure 1:
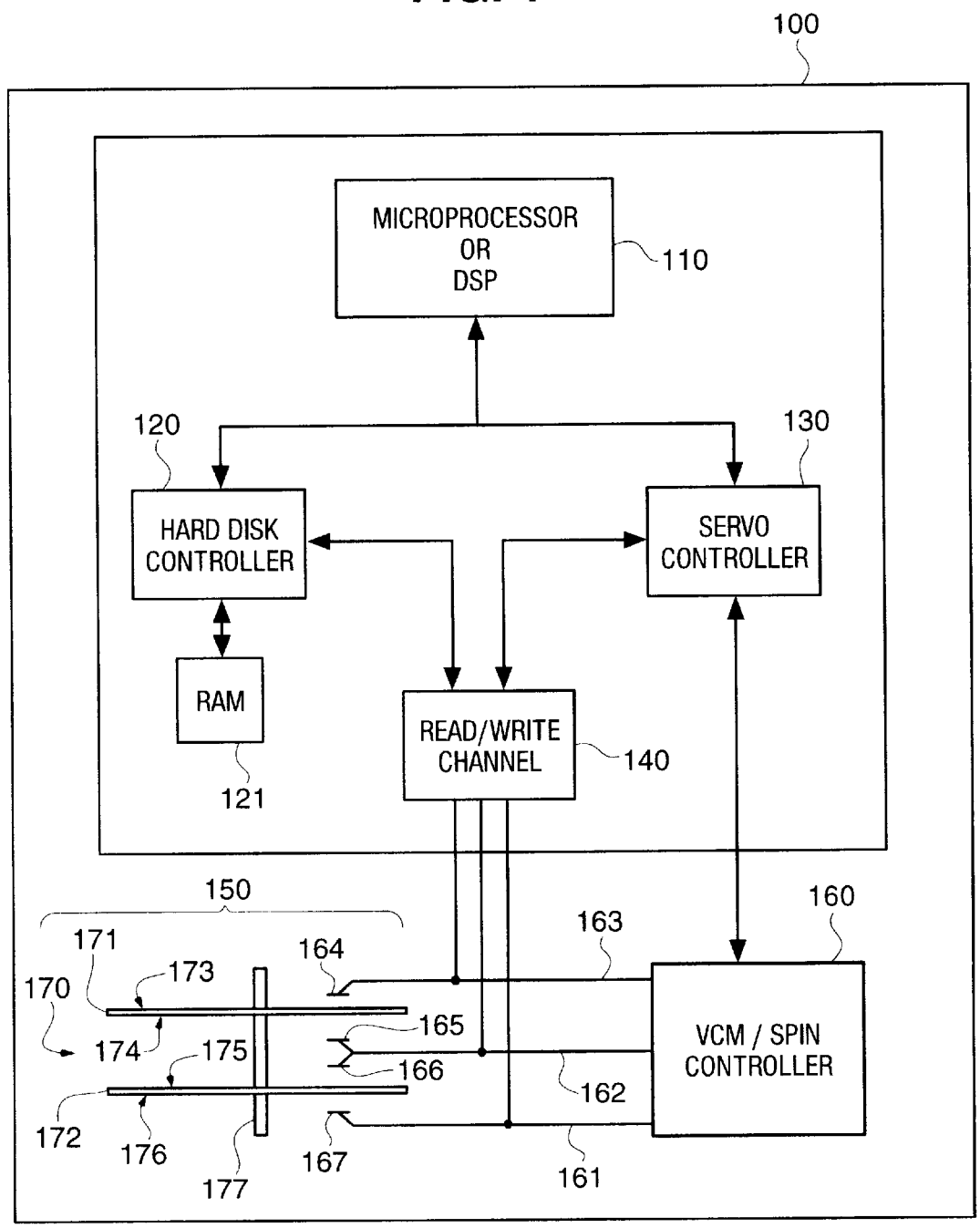
FIG. 1 illustrates an example system level view of a magnetic disk device architecture in block diagram form.

Magnetic Disk Device Architecture—FIG. 1

FIG. 1 illustrates a system level architecture view of a magnetic disk device 100 in block diagram form. The primary components in magnetic disk device 100 include, but are not limited to, disk control components 110–140 and operational disk components 150–160. Disk control components 110–140 include, but are not limited to, a microprocessor or Digital Signal Processor (DSP) 110, a hard disk controller 120 with accompanying RAM 121, a servo controller 130, and a read/write channel controller 140. The microprocessor or DSP 110 is the highest level of control and coordination for all disk device activities and read/write operations executed by the disk control components. Hard disk controller 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo burst information and controls positioning activities of read/write heads. Read/write channel 140 passes data between the operational disk components 150–160 and the disk control components 110–130 for each read/write operation.

Operational disk components 150–160 include, but are not limited to, a Head and Disk Assembly (HDA) 150 that includes magnetic disk 170 and read/write heads 164–167, a Voice Coil Motor (VCM)/spin controller 160 that is operatively connected to access arms 161–163. Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. Read/write heads 164–167 are positioned to fly just off the recording surfaces 173–176 respectively when the magnetic disk 170 is spinning. Although other magnetic disk device architectures are possible other than the architecture described above, no limitation is intended or implied with respect to the present invention. The present invention is applicable to any headerless format magnetic or optical disk regardless of a single platter or multiple platter implementation or a removable medium or floppy disk medium.

Figure 2:
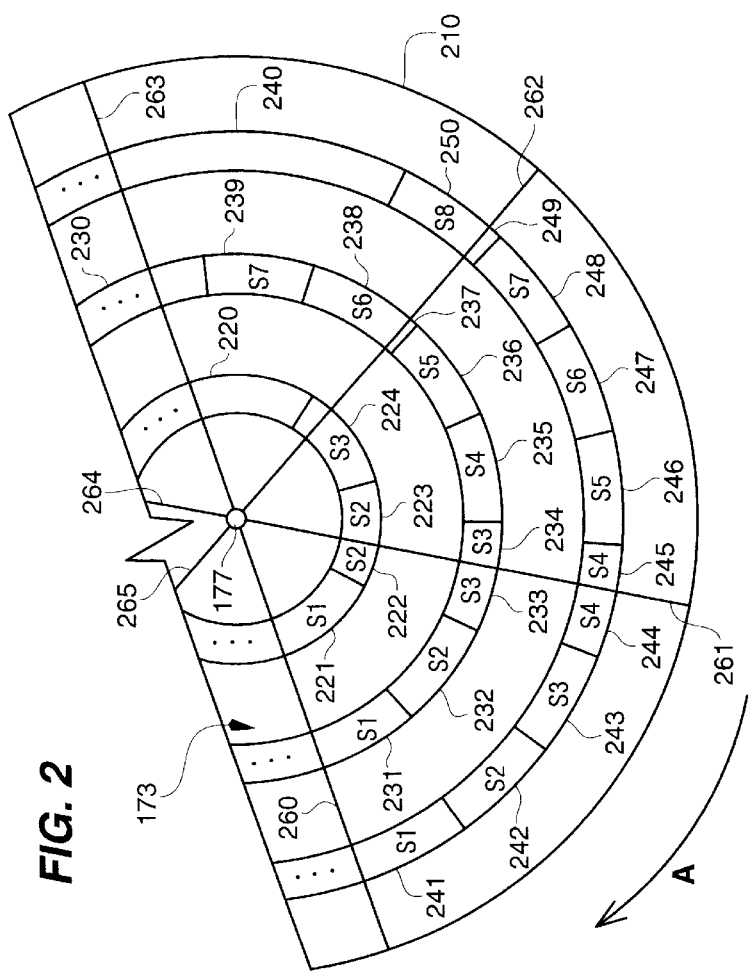
FIG. 2 illustrates an top view of a track and sector format on a magnetic disk device recording surface.

Magnetic Disk Format—FIG. 2

FIG. 2 illustrates the track and sector format for a recording surface such as recording surface 173 of magnetic disk 170. Recording surface 173 comprises a plurality of concentric tracks of successively increasing size from the center spindle 177 to the outer edge 210. The present illustration focuses on tracks 220, 230, and 240. A cylinder is the set of all tracks of a given size from each recording surface of each platter in magnetic disk 170. Thus, if track 230 is the 6th concentric track of recording surface 173 and each recording surface of magnetic disk 170 has a 6th concentric track, then there exists a 6th cylinder for magnetic disk 170 that comprises each 6th concentric track of each recording surface. With a single motion of access arms 161–163, each read/write head 164–167 can be simultaneously positioned to read and/or write data from any one or more of the recording surfaces 173–176 in cylinder 6. If track 230 is the 6th track and read/write heads 164–167 are numbered 00 through 03 respectively, then the cylinder CC and head HH address for track 230 on recording surface 173 would be "0600".

Each track on each recording surface such as recording surface 173 includes regularly spaced and radially aligned servo burst markings 260–265. Each servo burst that resides on each track contains, among other things, specific cylinder, head, and servo burst number information that uniquely identifies the location of each servo burst. For purposes of the present illustration, servo bursts 260–265 are numbered 0–5 respectively.

Data sectors, also known as sectors, blocks, or records, are fixed length addressable subdivisions of a track that typically contains data that is written to the disk. For example, a typical data sector size might be 512 bytes long. To simplify the discussion accompanying FIGS. 2–4, the data sectors 221, 231, and 241 are identified as sector number 1 that each begin on an even full data sector boundary from servo burst 260. A given track does not always begin with data sector 1 at servo burst 0 for reasons beyond the scope of this discussion.

Figure 3:
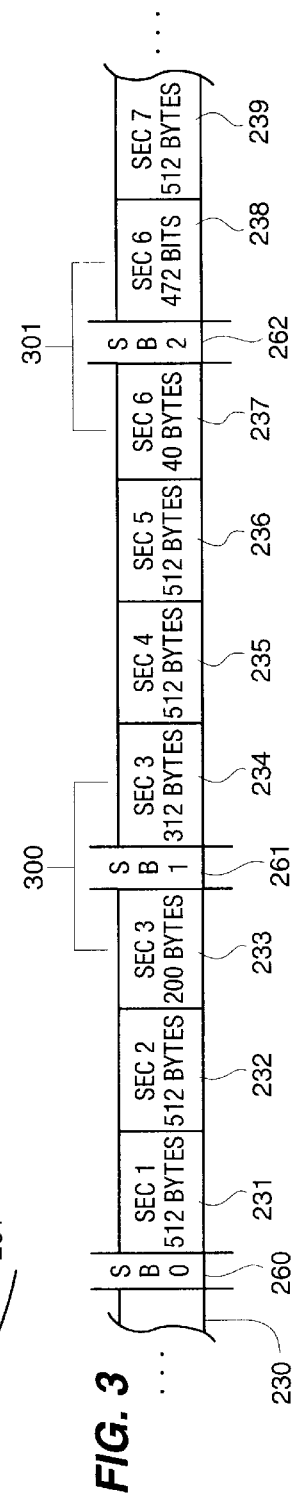
FIGS. 3–4 illustrate detailed views of a track and sector format in block diagram form.
Figure 4:
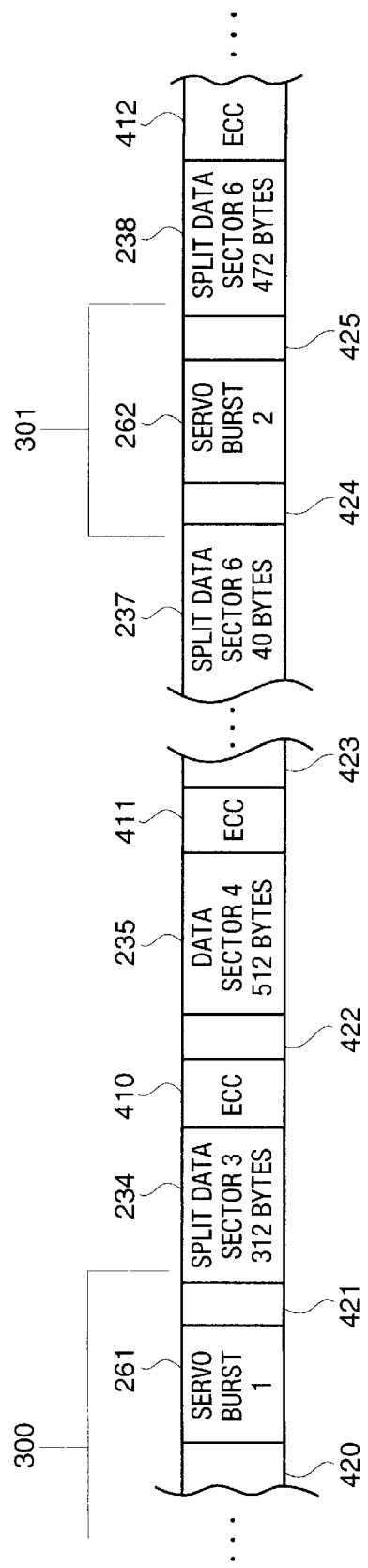

Detailed Track and Sector Format—FIGS. 3–4

FIGS. 3–4 illustrate successively detailed format views of a segment of track 230. FIG. 3 illustrates a segment of track 230 that includes servo bursts 260–262 and data sectors 231–239. Specifically, data sectors 231–232, 235–236, and 239 are shown as being full sectors of 512 bytes each for example purposes. Split data sector 300 contains a leading or first data sector segment 233 having 20 bytes and a trailing or second data sector segment 234 having the remaining 312 bytes of an otherwise full 512 byte data sector. Similarly, split data sector 301 contains a leading or first data sector segment 237 having 40 bytes and a trailing or second data sector segment 238 having the remaining 472 bytes of an otherwise full 512 byte data sector.

FIG. 4 illustrates a further detailed view of a segment of track 230 that shows the gaps 420–425 between fields in a headerless format. For example, servo burst 261 is preceded and followed by gaps 420 and 421 respectively. Gaps 420 and 421 are sufficiently wide to allow a read/write channel to switch between servo and data frequencies and to allow for spin variations of the disk itself. Similar gaps 424 and 425 exist around servo burst 262. Gaps 422 and 423 separate individual data sectors. ECC fields such as fields 410–412 always follow the last byte of a full data sector or the last byte of the second segment of a split data sector such as 234 and 238. For example, both split data sector segments 237 and 238 of split data sector 301 require only one ECC field.

Figure 7:
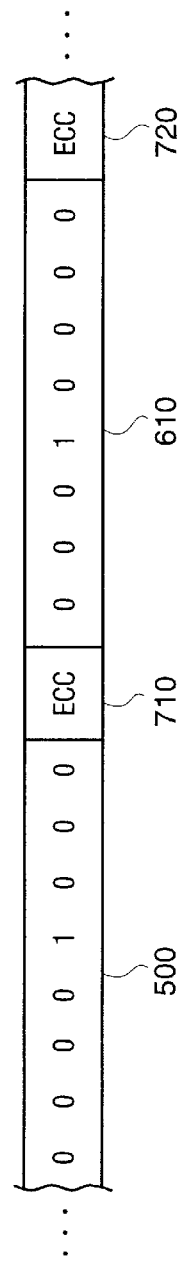
FIG. 7 illustrates an alternative defective data sector map with error correction and redundancy in block diagram form.
Figure 5:
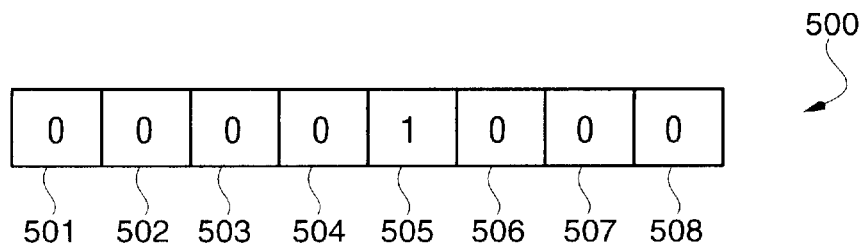
FIG. 5 illustrates a defective data sector map in block diagram form.
Figure 6:
FIG. 6 illustrates a series of consecutive defective sector maps in block diagram form.

Defective Data Sector Map—FIGS. 5–7

FIG. 5 illustrates an example of a defective data sector map 500. The defective data sector map 500 contains a plurality of binary digits such as bits 501–508. Each bit 501–508 corresponds to a consecutive data sector on a section of at least one track. A "0" bit, for example, can indicate a non-defective or flawless data sector that can be used for reliable data storage service. A "1" bit, for example, can indicate a defective or flawed data sector that can not be reliably used for data storage service. Defective data sectors may exist for reasons that include, but are not limited to, materials flaws and/or manufacturing flaws in the magnetic disk 170.

In one preferred embodiment, the defective data sector map 500 is stored in a gap in the disk format that precedes the section of the track that is mapped by the defective data sector map. Examples of gaps in the disk format are previously disclosed in the text accompanying reference numbers 420–425 in FIG. 4. Preferred gaps include either the gap preceding a servo burst or the gap following a servo burst. For example, if the defective data sector map 500 were stored in gap 420, then bit 501 would correspond to data sector 234, and bit 502 would correspond to data sector 235 and so on.

Alternatively, an existing disk administration field that contains reserve or other available space could be used to store the defective data sector map. One such administrative field is the servo burst itself that could contain a defective data sector map for all data sectors between the present servo burst and the next servo burst. However, persons skilled in the art of magnetic disk device design have sharply differing views on the subject of whether such defective data sector information should be allowed in a disk administration field or not. The advantage of storing the defective data sector map in the servo burst itself or in the gap immediately preceding or immediately following the servo burst, is because the defective data sector information is immediately available when the servo burst is read and the information immediately precedes the data sectors represented in the map.

The size of the section of a track that is mapped by a defective data sector map is user defined and can be 16, 32, or 64 bits or more up to an entire zone worth of bits depending on the amount of defective data sector look-ahead that is desired. For purposes of presenting a manageable illustration, the present discussion accompanying the defective data sector map 500 includes only 8 bits. The number of bits in the present 8 bit illustration is in no way intended as a limitation on the present invention as disclosed and claimed herein. Note also that because the majority of bits in a defective data sector map typically indicate non-defective data sectors, larger defective data sector maps can be compressed by repetitive bit encoding a long string of "0" bits, for example, that do not include intervening "1" bits. One disadvantage of a defective data sector map that is too large is that it contains more data than is immediately necessary. Another disadvantage of a data sector map that is too large such as an entire tracks worth of mapping, is that each servo burst in the track must be accompanied with the map because it is never certain which servo burst will be first encountered by a read/write head.

FIG. 6 illustrates a defective data sector map sequence 600 for a series of defective data sector maps 500 and 610–613 that are individually stored within or near five successive data sectors. Defective data sector map 500 illustrates a single defective data sector at bit position 505 in the map based on the bit being a one where a "1" bit indicates a defective data sector and a "0" indicates a non-defective data sector. In the present example then, the disk control device interpreting defective data sector map 500 is being informed that there is a defective data sector located five sectors from the present disk location of defective data sector map 500. Similarly, each successive defective data sector map 610–613 is a shifting N-bit window that confirms an approaching defective data sector indicated by map bit 505 in addition to the status of upcoming data sectors as indicated by bit positions 620 through 623 in the respective maps. Thus, not only do the successive defective data sector maps 500–613 facilitate a compact and continuous N-sector lookahead, the overlap of successive maps facilitates a redundant confirmation of the accuracy and/or validity of each map.

To the extent that successively overlapping maps agree as to the defective or non-defective status of upcoming data sectors within an N-sector lookahead view, the appropriate disk control components will avoid using the defective data sectors for reliable data storage. However, disagreement among at least one of the successively overlapping maps can be handled in a variety of ways. If there is only one defective data sector map available prior reaching the data sector that is the target of the present head settling, then the map must be trusted as is. Errors can be detected and/or corrected in individual maps if each individual map is accompanied by an ECC as disclosed in the text accompanying FIG. 7. Alternatively, if only one map does not correlate with the data sector status of preceding or succeeding maps, then the one disagreeing map can be ignored as being incorrect or the disagreeing map can be checked with an ECC if ECC fields accompany each map. If more that one successively overlapping defective data sector maps disagree, then an ECC must accompany each field to detect and/or correct the faulty map or maps at the time they are read and prior to comparison. One of many types of ECC is a Hamming code.

FIG. 7 illustrates an alternative configuration of a defective data sector map 500 accompanied by an ECC field 710. The ECC field 710 can be used to check the validity of the bit representation within defective data sector map 500 without comparing defective data sector map 500 with any other overlapping map. ECC field 710 is generated and written to the disk at the same time as the defective data sector map 500 itself.

In a further alternative configuration, two or more successive defective data sector maps 500 and 610 can be stored in the same location on the disk to increase the lookahead capability of the system. In this alternative, maps 500 and 610 are read as a pair from a location that immediately precedes the data sectors mapped by defective data sector map 500. The data sectors corresponding to defective data sector map 610 provide only a preview of upcoming data sectors that will follow the data sectors corresponding to defective data sector map 500.

Defective data sector map 610 can be used as a redundant verification of the overlapping map bits in defective data sector map 500. In the scenario where defective data sector maps 500 and 610 are accompanied by their own ECC fields 710 and 720 respectively, the preview reading of defective data sector map 610 provides an opportunity for appropriate data control components to detect and/or correct errors in the map well in advance of actually encountering the data sectors that correspond to defective data sector map 610.

Figure 8:
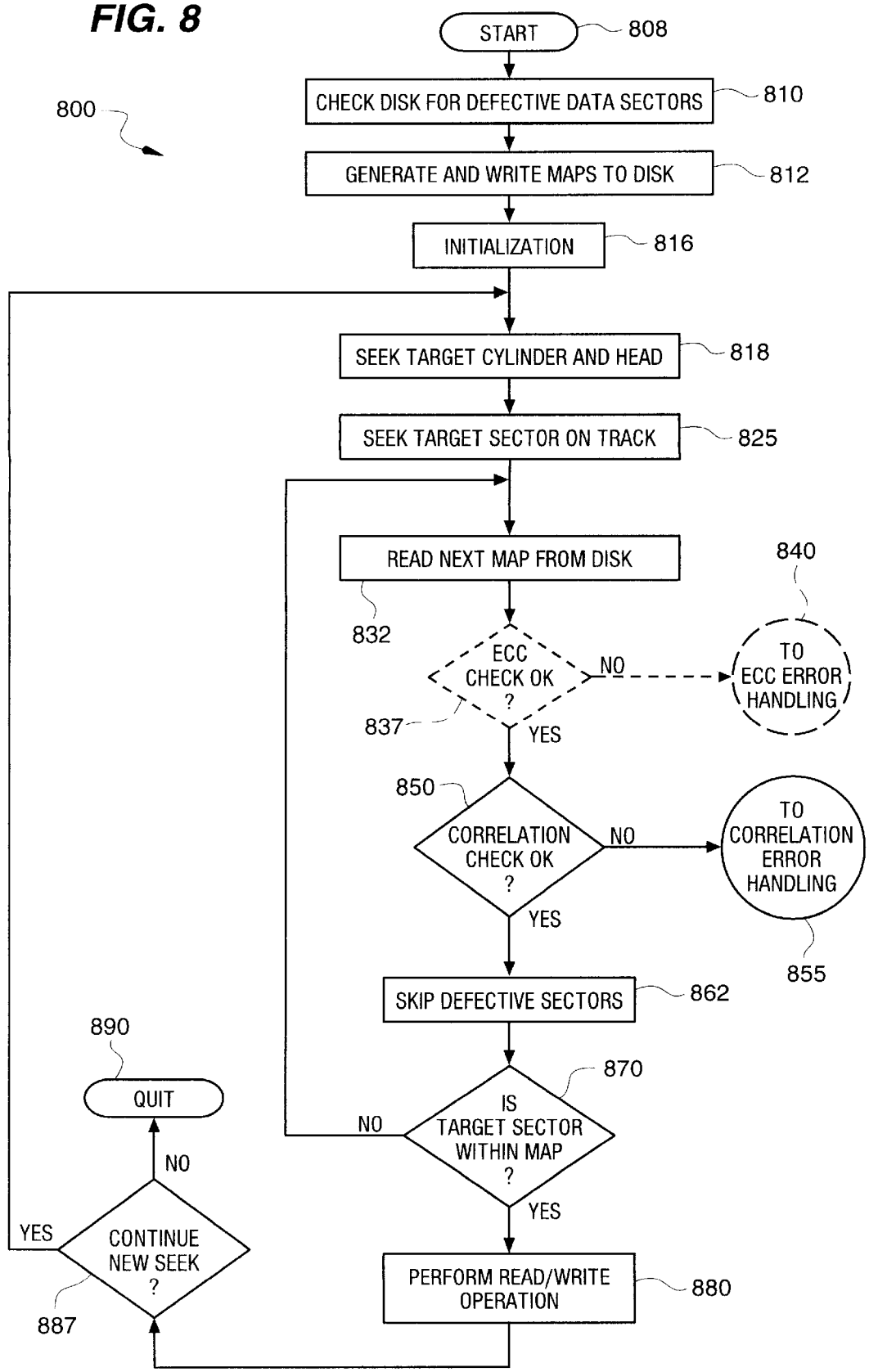
FIG. 8 illustrates the operational steps for using the defective data sector information management system in flow diagram form.

Operational Steps—FIG. 8

FIG. 8 illustrates the operational steps 800 for the defective data sector management system of the present invention. The operational steps 800 begin at step 808 and proceed to step 810 where the magnetic disk is checked at manufacturing time to identify any defective data sectors that may exist. At step 812, defective data sector maps are generated in view of the step 810 results, and the respective defective data sector maps are written to the magnetic disk in locations as previously disclosed. The magnetic disk is now ready for customer use and the following steps are from a post-manufacturing ordinary customer use perspective.

At step 816, the magnetic disk 170 is powered up and the disk control components and the operational disk components of the magnetic disk device are initialized to an operational state. At step 818, a read/write command is executed and a seek begins to locate the cylinder and head of a target address on the disk. As the seek resolves the cylinder and head portion of the target address, the seeking focuses on an individual track at step 825 to locate the data sector portion of the target address. When a read/write head is settling on a track, the system looks for and reads the first defective data sector map that is encountered at step 832. If the optional ECC field accompanies the defective data sector map, then the ECC field is used to check the contents of the immediate defective data sector map. If, in the situation where the ECC field exists, the defective data sector map is determined to have an error at decision step 837, then processing continues at the ECC error handling step 840. Alternatively, if it is determined at decision step 837 that the ECC check did not detect any errors in the defective data sector map, then processing continues to decision step 850.

If at decision step 850 it is determined that the present defective data sector map does not correlate with at least one previously read overlapping defective data sector map, then processing continues at the error handling step 855. Alternatively, if it is determined at decision step 850 that the present defective data sector map does correlate with at least one or all previously read overlapping defective data sector maps, then processing continues at step 862 where any defective data sectors noted in the present defective data sector map are avoided as being unreliable for data storage use.

If at decision step 870 it is determined that the target data sector is not within the scope of the present defective data sector map, then processing continues at step 832 where the next defective data sector map encountered on the track is read and processed in the manner previously disclosed. Alternatively, if at decision step 870 it is determined that the target data sector is within the scope of the present defect data sector map then processing continues at step 880 where the read/write operation proceeds at the specified target address. At decision step 887, processing can either continue with a new seek for a new target address at step 818 or if no other read/write operations are scheduled then processing can stop at step 890.

SUMMARY

The present invention comprises a disk resident system for managing defective data sector information in a headerless format magnetic disk device. The defective data sector information can be recorded in gaps between fields in the headerless disk format itself preferably within or near each servo burst. The defective data sector information is represented as a plurality of binary digits in a defective data sector map where a "1" can indicate a defective data sector and a "0" indicates a non-defective data sector. Each bit in the defective data sector map corresponds to a data sector in the set of data sectors that immediately follow the defective data sector map location. The defective data sector maps can include ECC coding and/or other redundancy checks where defective data sector maps overlap for redundancy and on-the-fly error correction purposes.

Although specific embodiments are disclosed herein, it is expected that persons skilled in the art can and will make, use, and/or sell alternative defective data sector management systems that are within the scope of the following claims either literally or under the Doctrine of Equivalents.

What is claimed is:

1. A defective data sector information management system for use in identifying a precise location of a defective data sector in a disk having a headerless disk format, said system comprising:

a defective data sector map containing a plurality of bits wherein each bit represents a defective or non-defective status of a corresponding data sector on the disk;

means for writing said defective data sector map on said disk in an area within said headerless disk format;

means for reading said defective data sector map from said disk during a search for a data sector;

means for distinguishing defective data sectors from non-defective data sectors in at least one section of at least one track proximate said defective data sector map; and means for correlating redundant bits of a successive plurality of consecutive defective data sector maps that correspond to a common region of said magnetic disk device; and means for verifying inconsistencies in at least one of said successive plurality of consecutive defective data sector maps in response to said correlating means.

2. A system according to claim 1 wherein said defective data sector map is associated with:

an error correction coding of said defective data sector map; and means for determining with said error correction coding that said defective data sector map is error free.

3. A system according to claim 1 wherein said area in said headerless disk format is a gap between fields in said headerless disk format.

4. A system according to claim 3 wherein said gap immediately precedes a servo burst.

5. A system according to claim 3 wherein said gap immediately follows a servo burst.

6. A system according to claim 1 wherein said area in said headerless disk format is a disk administration field.

7. A system according to claim 6 wherein said disk administration field is a servo burst.

8. A system according to claim 1 including:

means for correlating a first defective data sector map with a second defective data sector map that maps at least one data sector in common with said first defective data sector map; and means for verifying anomalies in at least one of a series of consecutive defective data sector maps in response to said means for correlating.

9. A system according to claim 1 including:

means for compressing successive ones of said plurality of bits that reflect only one of two binary types of defect status, said two binary types of defect status being selected from a group comprised of: defective and non-defective.

10. A method for managing defective data sector information on a disk having a headerless disk format, said method comprising:

reading a defective data sector map from an area in said headerless disk format during a search for a target data sector wherein said defective data sector map contains bits that each represent a defective or non-defective status of a corresponding data sector on the disk;

distinguishing defective data sectors from non-defective data sectors in at least one section of at least one track proximate said defective data sector map;

correlating redundant bits of a successive plurality of consecutive defective data sector maps that correspond to a common region of said magnetic disk device; and verifying inconsistencies in at least one of said successive plurality of consecutive defective data sector maps in response to said correlating step.

11. A method according to claim 10 including:

generating said defective data sector map; and writing said defective data sector map in said area in said headerless disk format selected from at least one of a group comprised of: a gap immediately preceding a servo burst field, a gap immediately following a servo burst field, and within a servo burst field.

12. A method according to claim 11 including:

generating an error correction coding of said defective data sector map; and writing said error correction coding and said defective data sector map in said area in said headerless disk format.

13. A method according to claim 11 including:

compression encoding successive ones of said plurality of bits that reflect only one of two binary types of defect status, said two binary types of defect status being selected from a group comprised of: defective and non-defective.

14. A method according to claim 10 including:

identifying errors in said defective data sector map using an error correction coding accompanying said defective data sector map.

15. A method according to claim 10 including:

verifying integrity of said defective data sector map with an error correction code of said defective data sector map.

16. A defective data sector information management system on a disk having a headerless disk format, said system comprising:

a series of defective data sector maps, wherein each defective data sector map comprises a shifting N-bit window containing a plurality of binary digits wherein each binary digit represents a defective or non-defective status of a corresponding data sector on the disk;

means for distinguishing defective data sectors from non-defective data sectors in at least one section of at least one track proximate said defective data sector map in view of contents of said defective data sector maps.

17. A system according to claim 16 including:

means for writing said defective data sector map in an area in said headerless disk format; and means for reading said defective data sector map from said area in said headerless disk format during a search for a target data sector.

18. A system according to claim 17 wherein said area is selected from a group comprised of: a gap in said headerless disk format, and a disk administration field in said headerless disk format.

19. A system according to claim 18 wherein said area is within a servo burst.

20. A system according to claim 18 wherein said area is selected from a group comprised of: a gap immediately preceding a servo burst, and a gap immediately following a servo burst.

21. A system according to claim 16 wherein said defective data sector map is associated with:

an error correction coding of said defective data sector map; and means for detecting and correcting errors in said defective data sector map with said error correction coding.

22. A system according to claim 16 including:

means for correlating redundant bits of a successive plurality of consecutive defective data sector maps that correspond to a common region of said magnetic disk device; and means for verifying inconsistencies in at least one of said successive plurality of consecutive defective data sector maps in response to said correlating step.

23. A system according to claim 16 including:

means for compression encoding successive ones of said plurality of bits that reflect only one of two binary types of defect status, said two binary types of defect status being selected from a group comprised of: defective and non-defective.

24. A defective data sector management system comprising:

first means for directing the system to write a defective data sector map on a disk wherein said defective data sector map contains bits that each represent a defective or non-defective status of a corresponding data sector on the disk, the first means for directing is further for directing the system to write the defective data sector map proximate to a servo burst, and wherein bit positions in the defective data sector map correspond to data sector locations relative to the servo burst;

second means for directing the system to read said defective data sector map from said disk; and third means for distinguishing defective data sectors from non-defective data sectors based on said defective data sector map.

25. A system according to claim 24 wherein said defective data sector map includes:

an error correction coding of said defective data sector map; and means for determining with said error correction coding that said defective data sector map is error free.

26. A system according to claim 25 including:

means for compressing successive ones of said plurality of bits that reflect only one of two binary types of defect status, said two binary types of defect status being selected from a group comprised of: defective and non-defective.

* * * * *